US011985595B2

(12) United States Patent
Yehezkely et al.

(10) Patent No.: US 11,985,595 B2
(45) Date of Patent: May 14, 2024

(54) LOW POWER WIRELESS DEVICE WITH SENSITIVE WAKEUP RADIO

(71) Applicant: Wiliot, Ltd., Caesarea (IL)

(72) Inventors: Alon Yehezkely, Haifa (IL); Sagi Kupferman, Herzliya (IL); Ido Yogev, Pardes-Hana Karkur (IL)

(73) Assignee: Wiliot, Ltd., Caesarea (IL)

( * ) Notice: Subject to any disclaimer, the term of this patent is extended or adjusted under 35 U.S.C. 154(b) by 205 days.

(21) Appl. No.: 17/501,158

(22) Filed: Oct. 14, 2021

(65) Prior Publication Data

US 2023/0124569 A1    Apr. 20, 2023

(51) Int. Cl.
*H04W 52/02* (2009.01)
*H04W 4/23* (2018.01)
*H04W 4/80* (2018.01)

(52) U.S. Cl.
CPC ......... *H04W 52/0229* (2013.01); *H04W 4/23* (2018.02); *H04W 4/80* (2018.02); *H04W 52/028* (2013.01)

(58) Field of Classification Search
CPC . H04W 52/0229; H04W 52/028; H04W 4/23; H04W 4/80
USPC ....................................................... 370/318
See application file for complete search history.

(56) References Cited

U.S. PATENT DOCUMENTS

| 10,804,946 | B2 | 10/2020 | Wang et al. |
| 2002/0075134 | A1 | 6/2002 | Schieke et al. |
| 2004/0119517 | A1 | 6/2004 | Pauletti et al. |
| 2014/0062672 | A1 | 3/2014 | Gudan et al. |
| 2014/0111259 | A1 | 4/2014 | Lin |
| 2016/0105162 | A1 | 4/2016 | Zangi et al. |
| 2016/0254844 | A1* | 9/2016 | Hull ..................... H04B 5/0037 340/6.1 |
| 2019/0371342 | A1 | 12/2019 | Tukka et al. |
| 2020/0272799 | A1* | 8/2020 | Kim .................. G06K 7/10237 |
| 2021/0104917 | A1* | 4/2021 | Kim .................. H04W 52/0229 |
| 2021/0219335 | A1 | 7/2021 | Zhang et al. |

FOREIGN PATENT DOCUMENTS

KR    20110062557 A    6/2011

OTHER PUBLICATIONS

Mohamed Mansour et al. "Enhanced Broadband RF Differential Rectifier" (Year: 2019).*
International Search Report and Written Opinion of International Searching Authority for PCT/US2021/059462, ISA/IL, Jerusalem, Israel, dated Jan. 30, 2022.

(Continued)

*Primary Examiner* — Intekhaab A Siddiquee
(74) *Attorney, Agent, or Firm* — M&B IP Analysts, LLC

(57) ABSTRACT

A wakeup circuit operable in a low-power wireless device is provided. The wakeup circuit includes at least one radio frequency rectifier configured to output a rising transient voltage in response to existence of a RF signal received at an antenna of the wireless device; and a detector configured to output a wakeup signal when an input voltage level of the detector is higher than a reference voltage signal, wherein a signal output by the detector upon detection of a wakeup signal causes resetting each of the at least one rectifier upon detection of the wakeup signal; and wherein the wakeup circuit is coupled to an antenna interface of the wireless device.

17 Claims, 4 Drawing Sheets

(56) References Cited

OTHER PUBLICATIONS

David Galante-Sempere, Dallos Ramos-Valido, Sunil Lalchand Khemchandani and Javier del Pino. "Low-Power RFED Wake-Up Receiver Design for Low-Cost Wireless Sensor Network Applications". https://www.mdpi.com/1424-8220/20/22/6406.
Gerd Ulrich Gamm; Matthias Sippel; Milos Kostic; Leonhard M. Reindl. "Low power wake-up receiver for wireless sensor nodes". Dec. 7-10, 2010. https://ieeexplore.ieee.org/document/5706778.
Haowei Jiang, Po-Han Peter Wang, Li Gao, Corentin Pochet, Gabriel M. Rebeiz, Drew A. Hall, Patrick P. Mercier. "A 22.3-nW, 4.55 cm2 Temperature-Robust Wake-Up Receiver Achieving a Sensitivity of -69.5 dBm at 9 GHz". Jun. 6, 2020 https://bioee.ucsd.edu/papers/A%2022.3-nW,%204.55%20cm2%20Temperature-Robust%20Wake-Up%20Receiver%20Achieving%20a%20Sensitivity%20of%20%e2%88%9269.5%20dBm%20at%209%20GHz%20-%20Mercier%20(JSSC,%202020).pdf.
Martin Tomasz Senior Scientist Touchstone Semiconductor, Inc. "A Unique, Ultra-low Power Analog IC Enables RF Wakeup Applications". https://www.google.com/url?sa=t&rct=j&q=&esrc=s&source=web&cd=&cad=rja&uact=8&ved=2ahUKEwiWxt2Wz_LxAhXoMIkFHV3gDWEQFjABegQIBRAD&url=https%3A%2F%2Fwww.digikey.com%2FSite%2FGlobal%2FLayouts%2FDownloadPdf.ashx%3FpdfUrl%3D9FF445EB4C7A4E6D94ECB980372DC036&usg=AOvVaw2etQsiboltjfXuWbarfW1o.
Mohamed Zgaren; Mohamad Sawan. "Low-Power RFED Wake-Up Receiver Design for Low-Cost Wireless Sensor Network Applications". Dec. 6, 2015 https://ieeexplore.ieee.org/document/7440317.

\* cited by examiner

LOW POWER WIRELESS DEVICE WITH SENSITIVE WAKEUP RADIO

TECHNICAL FIELD

The present disclosure generally relates to wake-up circuits of low power wireless devices.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use wireless communication protocol that supports IoT devices for remote monitoring. Typically, IoT devices encapsulate wireless sensors or a network of such sensors.

Most IoT devices are wireless devices that collect data and transmit such data to a central controller. There are a few requirements to be met to allow widespread deployment of IoT devices. Such requirements include reliable communication links, low energy consumption, low costs, and small sizes.

To this aim, IoT devices and wireless sensors are designed to support low power communication protocols, such as Bluetooth low energy (BLE), LoRa, and the like. However, IoT devices utilizing such protocols require a battery, e.g., a coin battery. The reliance on a power source (e.g., a battery) is a limiting factor for electronic devices, due to, for example, cost, size, lack of durability to environmental effects, and frequent replacements. An alternative to using batteries, a self-sufficient or self-sustainable power supply that may harvest energy from sources such as light, heat, activity, piezoelectric, and electromagnetic energy can be incorporated.

Electromagnetic energy that includes radio frequency (RF) is promising in its relatively unrestricted spatial freedom and abundance.

For RF devices, majority of the device energy is consumed by the transceiver at the active state, when the system actively communicates and processes such communication signals. It has been identified that the device in its active state consumes up to 3 to 4 orders of magnitude of energy compared to its sleep state. In this regard, wakeup radio techniques have been incorporated in RF-based wireless devices for energy conservation. In an embodiment, a wakeup radio technique is configured with a separate low-power-consuming wakeup receiver to monitor the incoming RF signals and only activate (or wakeup) the system from its sleep state when target signals are detected.

However, challenges remain in that such wakeup receivers may lack sensitivity and be vulnerable to undesired, false wakeup signals. This may cause random and frequent activation that may negatively affect the system by draining the stored energy of the wireless device. A tradeoff exists between a wakeup detection time and sensitivity of the wakeup receiver. That is, reducing the sensitivity would decrease the wakeup detection time. However, that may increase the false wake-up signal detection. In particular, such sensitive false detection may occur in a wireless device, such as an IoT tag that operates in the 2.4 GHz ISM radio frequency band, which is densely populated with wireless signals. Selectively activating the system within the abundance of signals in similar range still remains a challenge.

Furthermore, typical RF-based IoT tags include free running oscillators that include crystal resonators such as a quartz resonator or a microelectromechanical system (MEMS) based resonator to provide a sufficiently accurate and stable time and/or frequency reference. However, for low-cost, low-powered, and small form factored IoT devices, it is desirable to omit such a resonator. In this scenario, the wakeup and acquisition of wake-up signals should occur very fast. For example, a proper operation of an IoT tag without a crystal should take less than a millisecond.

It would therefore be advantageous to provide a solution that would overcome the challenges noted above for fast and accurate detection of wake-up signals in wireless IoT tags.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a wakeup circuit operable in a low-power wireless device comprises at least one radio frequency rectifier configured to output a rising transient voltage in response to existence of a RF signal received at an antenna of the wireless device; and a detector configured to output a wakeup signal when an input voltage level of the detector is higher than a reference voltage signal, wherein a signal output by the detector upon detection of a wakeup signal causes resetting each of the at least one rectifier upon detection of the wakeup signal; and wherein the wakeup circuit is coupled to an antenna interface of the wireless device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
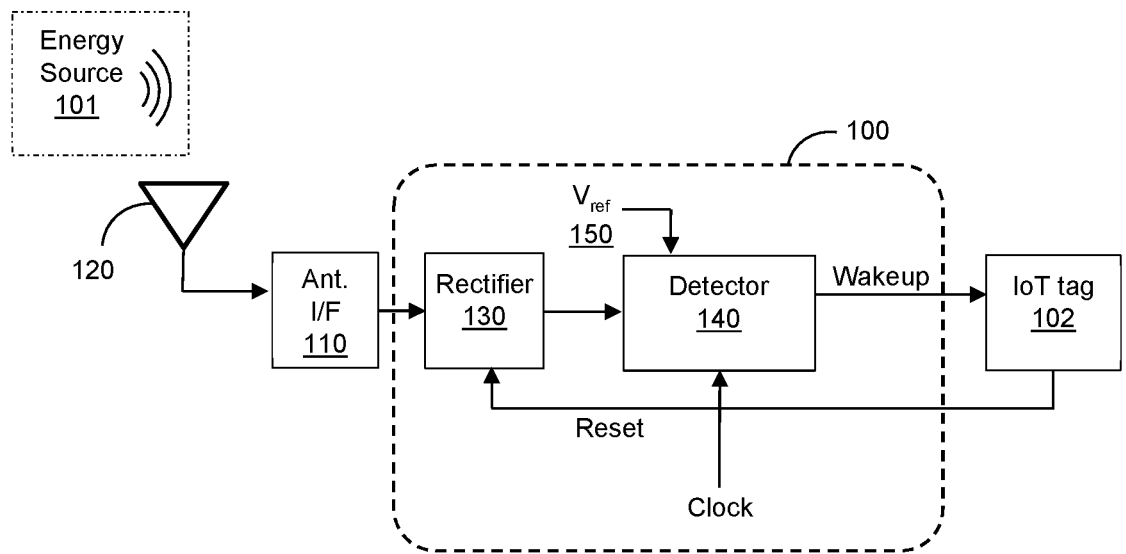
FIG. 1 is a schematic diagram of a wakeup receiver according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example schematic diagram of a wakeup receiver 100 according to an embodiment. The wakeup receiver 100 is configured with a radio frequency rectifier 130, a detector 140, and a reference voltage 150. The wakeup receiver 100 is coupled to an antenna 120 through an antenna interface (Ant. I/F) 110 to receive wireless signals from the energy source 101. The signals may include radio signals in the 2.4 GHz or 900 MHz ISM radio frequency bands. Such signals include, but are not limited to, Wi-Fi, Bluetooth, Zigbee®, wireless keyboard, mouse, cordless phones, baby monitors, WPAN networks such as IEEE 802.15.4, and the like. According to an embodiment, the wakeup receiver 100 is configured to receive and wake-up on signals (beacons) transmitted on BLE advertising channels (e.g., BLE Advertising beacons) transmitted from the energy source 101. More particularly, specific transmission patterns of wireless signals, for example of BLE beacons, may be identified by detecting signal transmission periods and gap periods between signals.

The antenna interface 110 allows the wakeup receiver 100 to share the same antenna interface as a transceiver (transmitter and receiver) circuitry of the device (e.g., IoT tag 102). The antenna 120 serves the wakeup receiver 100 as well as the transceiver.

In an embodiment, the antenna interface 110 operates as a regenerative amplifier or Q-enhanced amplifier. This operation mode is also useful in combination with the wakeup receiver 100 to boost its input signal and hence to operate from lower RF signals received at the antenna 120.

According to the disclosed embodiments, the wakeup receiver 100 is designed for a small, low power wireless IoT tag 102 with high sensitivity and selectivity. To this end, the receiver is designed with low power computation and high sensitivity to allow fast detection of a wakeup signal. In a further embodiment, the IoT tag 102 uses over-the-air signals as a reference clock. That is, the IoT tag 102 does not include a crystal or any physical source providing a reference clock that may increase cost, size, and power consumption in a wireless IoT device. The over-the-air signals are used for calibration to allow transmission and reception of signals, such as BLE signals. An example technique for calibration of the IoT tag 102 using over-the-air signals is described in more detail in U.S. Pat. No. 10,886,929 to Yehezkely et al, assigned to the common assignee, the contents of which are hereby incorporated by reference.

It should be appreciated that since a calibration operation follows the wakeup event, given the limited duration of the incident signal, a wakeup event (or signal) must be detected very fast, e.g., within tens of microseconds from the moment a RF signal is received. In an embodiment, a wakeup event is defined as a proper reception of a BLE advertising beacon on a BLE advertising channel. In an embodiment, in order to remove false detection, a wakeup event is triggered when consecutive BLE advertising beacons are received on at least two BLE advertising beacons.

To achieve the foregoing, a wakeup receiver 100 is to enable effective tuning of the antenna 120 and the wakeup receiver 100 to the target energy signal to increase the sensitivity of the wakeup receiver 100. The increased sensitivity may maximize the probability of activating (or waking up) the wireless device at the target signal of interest. An example target signal of interest is the BLE Advertising event signals of beacons on channel 37 (2402 MHz), channel 38 (2426 MHz), and channel 39 (2480 MHz). Such high sensitivity and selectivity of the disclosed wakeup receiver may lower the cost, size, and power consumption of the wireless IoT device for advancement.

The arrangement of the wakeup receiver 100 is further illustrated in FIGS. 2 and 4 below.

In an embodiment, the rectifier 130 is configured to produce energy envelopes of an on-off keying (OOK) wakeup signal and to convert RF input signals to an envelope signal inputted to the detector 140. A reference voltage 150 may be connected to provide a threshold for wakeup. For example, the detector 140 may compare the input voltage from the rectifier 130 to a reference voltage 150 to determine whether to wake up (or activate) the main transceiver in an IoT tag 102 or another wireless device that the wakeup receiver 100 is connected in. The detector 140 may be realized as a comparator. The comparator is, for example, a mixed signal device, analog input with a digital output.

Figure 2:
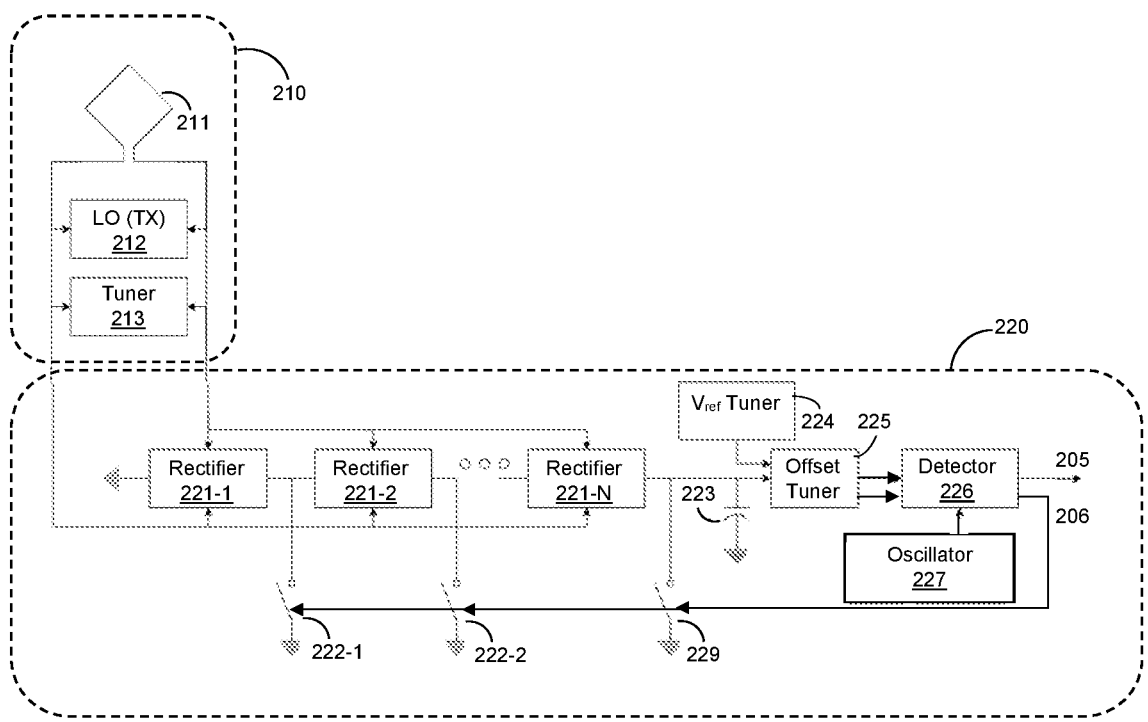
FIG. 2 is a block diagram of a wakeup receiver according to one embodiment.

FIG. 2 is an example block diagram of a wakeup receiver 220 according to an embodiment. The wakeup receiver 220 is coupled to an antenna interface 210.

The antenna interface 210 includes an antenna 211, a local oscillator (LO)/transmitter 212, and a frequency tuner 213. In an embodiment, the antenna 211 may be a transmit/receive antenna for transmission and reception of radio frequency signals from an energy source in the vicinity. In another embodiment, the antenna 211 may include multiple antennas that may be alternatingly operated.

In an example embodiment, an energy source may provide electromagnetic energy available from existing wireless signals in the environment. Such wireless signals may comply with known wireless standards, such as Wi-Fi (IEEE 802.11) which operates at the 2.4 GHz and 5-6 GHz bands, the BLE protocol which operates in the 2.400-2.4835 GHz band, Wi-Gig which operates at the 60 GHz band, a 802.15.4 technology such as Zigbee, cellular signals that comply with cellular standards (such as 2G, 3G, LTE, 4G, 5G, 5G mm Wave, and the like), and Industrial, Scientific, and Medical (ISM) frequency band such as sub 1 Ghz, frequency modulation (FM) radio signals, and the like. In an embodiment, radio frequency (RF) signals from such energy sources may be used as a time reference as well as for RF energy harvesting.

In an example embodiment, the energy source may be BLE Advertising beacons of Channel 37 (2402 MHz), Channel 38 (2426 MHz), and Channel 39 (2480 MHz) in the 2.4 GHz ISM frequency band. BLE Advertising event includes triplet of these beacons transmitted consecutively, typically 150 μs to 800 μs apart and repeated every 30 ms to 150 ms. These signals are distinguishable from beacons from other sources that have independent timing patterns. To this end, such particular frequency allocation and temporal signal patterns may be utilized for the wakeup receiver 220 to identify signal power envelopes of the BLE Advertising events for effective wake up of the system.

The local oscillator (LO)/transmitter 212 is configured to resonate at certain frequencies for receiving and transmitting data. The LO/transmitter 212 may be tuned to different carrier frequencies by the frequency tuner 213. It has been identified that calibration of the LO/transmitter 212 is important to effectively detect target wakeup signals (e.g., BLE Advertising beacons). In an embodiment, the LO/transmitter 212 is calibrated by the frequency tuner 213 configured with an antenna frequency controller (not shown). It has been further identified that the wakeup receiver 220 may be utilized to initiate calibration by detecting signals and providing frequency and/or time references for the LO/transmitter 212.

In an embodiment, the wakeup receiver 220 receives RF signals from the antenna 211 and outputs a wakeup event 205 which may be a digital signal to wakeup of the device, e.g., an IoT tag 102, FIG. 1.

The wakeup receiver 220 includes one or more rectifiers 221-1 through 221-N (hereinafter referred to individually as a rectifier 221 and collectively as rectifiers 221, N is an integer equal or greater than 1), corresponding to one or more switches 222-1 through 222-(N−1) (hereinafter referred to individually as switch 222 and collectively as switches 222, N is an integer equal or greater than 1), a load capacitor 223, a detector threshold tuner 224, a detector input offset tuner 225, a detector 226, and an oscillator 227. It should be noted that the last rectifier 221-N is connected to an end switch 229 which is configured to reset the load capacitor 223 in the wakeup receiver 220. Moreover, it is noted that the first rectifier 221-1 is connected to a ground. The rectifiers 221 share a common interface with the antenna interface 210 on the board (PCB) or inlay (not shown). Such configuration enables effective tuning of the antenna 210 and the wakeup receiver 220 to the target energy signal to increase the sensitivity of the wakeup receiver 220. The increased sensitivity may maximize the probability of activating (or waking up) the wireless device at the target signal of interest.

The number of rectifiers 221 are configurable. That is, out of the N rectifiers 221 at least one or more rectifiers may be activated. This is performed by sending a control signal to the switches 222 to short the respective rectifiers 221 to the ground. For example, to use only rectifier 221-1, the switches 222-2 through 222-N are short to the ground. It should be noted that the receiver's sensitivity is based, in part, on the number of rectifiers 221, i.e., the more stages (rectifiers), the higher the sensitivity. The control of the number of active rectifiers 221 is performed by a controller (not shown) after the IoT tag is activated and is operational.

In an embodiment, the wakeup receiver 220 is configured with a predefined number of rectifiers 221 with switches 222. Each switch 222 shorts its corresponding node to the ground. The reset of a rectifier 221 returns the rectifier to its initial state, which may enable "fresh" evaluation of an incoming RF signal received at the antenna 210. The reset of the rectifiers 221 is triggered upon detection of a wakeup event. The reset signal 206 is output by the detector 226.

In an embodiment, the switches 222 provide the gain control of their respective rectifiers 221 by statically changing the number of stages during operation. The number of stages may be reduced by shorting the switches 222 to the respective ground nodes. It should be noted that the gain control by the shorting of switches 222 may reduce input signals for more signal detection, and thus decrease sensitivity of the wakeup receiver 220. The rectifier 221 and switch 222 together form an energy envelope detector to provide signals through voltage to the detector 226.

In an embodiment, the detector 226 compares the value (voltage level) at the output of the last stage of the rectifier (e.g., rectifier 221-N) to determine the validity of the RF signal and wakeup of the system. The detector threshold tuner 224 provides a reference DC voltage for the detector 226 to compare with the received RF signal. In an embodiment, the reference DC voltage may be predetermined and tuned at the detector threshold tuner 224. The detector input transient signal is added to a DC voltage that is equal to reference DC voltage minus a tunable offset voltage 225 ("offset reference") that is adequate to suppress false triggering caused by any noises at the input of the detector 226. The threshold and offset tuners, 224 and 225 respectively, allow changing the optimal input bias point and the sensitivity of the receiver 220 respectively, where a smaller offset voltage results in higher sensitivity. For example, when the IoT tag is deployed in a room with no emitting RF devices the offset voltage would be tuned to a lower value. In contrast, when the IoT tag is deployed in a room dense with emitting RF devices the reference voltage would be tuned to a higher value to reduce false detection.

The detector 226 compares the reference voltage to the voltage level provided by the last rectifier 221-N. The detector 226 may be realized as an analog comparator.

The output of the detector 226 outputs a wakeup signal 205 after the comparison. In an embodiment, the indication from the detector 226 may be used by the digital logic of an IoT tag to wake-up. In another embodiment, the detector 226 outputs a reset signal 206 to the switches 222 for dynamic reset and gain control of the rectifier 221. The wakeup and reset signals are digital signals. Such dynamic reset and gain control enables rapid re-evaluation of signals for a relatively accurate detection of the signal power envelopes.

As noted above, the wakeup receiver 220 may share a common interface with the antenna interface 210. Such configuration enables the use of the wakeup receiver 220 based on information from LO/transmitter 212 internal measurements. In an embodiment, internal measurement of the LO/transmitter 212 may provide frequency tuner 213 setting values to be fed during the wakeup receiver 220 operation. In further embodiment, the tuning of the antenna interface 210 may provide tuning of the wakeup receiver 220 that will increase the detection, thus its sensitivity, to the target signals. It should be noted that the proposed configuration, having a common interface for the antenna interface 210 and the wakeup receiver 220, may not only increase sensitivity of the wakeup receiver for efficient power management, but may also decrease the size of the wireless device by removal of the reference clock.

In certain embodiments, a wakeup of a device (e.g., IoT tag) may be triggered after detection of a sequence of events in time. For example, in BLE standard, the Advertising Channels 37, 38, 39 being transmitted continuously by a device can be used as a wake-up sequence. Once at least 2 consecutive BLE advertising beacons are detected, the IoT tag wakes up.

The wakeup receiver 220 operates as an envelope detector, thus enabling to identify the patterns of the type of incoming RF signals. That is, detecting the sequence of events in time. An example for such detection over time is provided in FIG. 3. It should be appreciated that such configuration does not require a full wave envelope detector with filters at the output, but capable of operating with a very small load capacitor that may rapidly reset and discharge to confirm presence of target input signals.

Figure 3:
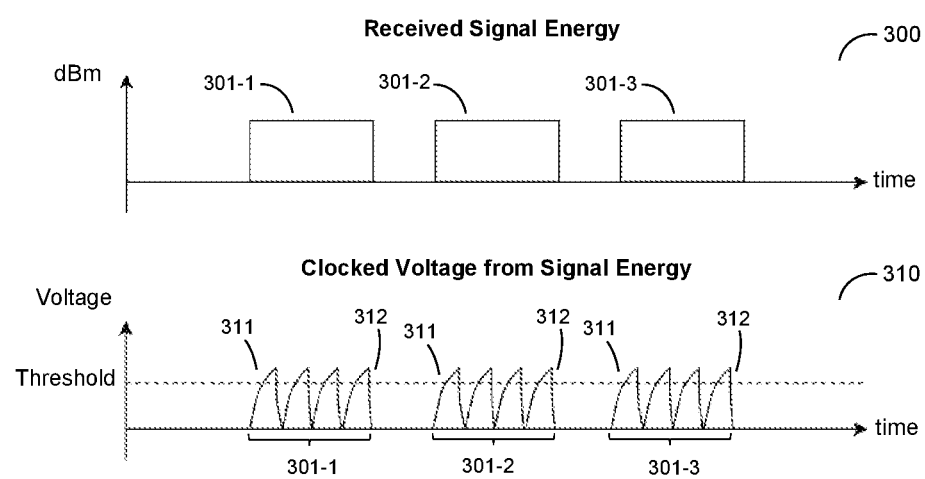
FIG. 3 are example graphs of a received signal energy and a voltage over time according to an embodiment.

FIG. 3 are example graphs of a received signal energy 300 and voltage 310 over time according to an embodiment. The received signal energy over time graph 300 shows power envelopes of the BLE Advertising beacons. Three separate voltage patterns 301-1 through 301-3 (hereinafter referred to individually as a power envelope 301 and collectively as power envelopes 301) indicate signals from channels 37, 38, and 39 of the BLE Advertising beacons, respectively. The received signal power, measured in decibel milliwatts (dBm), is a function of transmitted signal power from the energy source (101, FIG. 1), signal channel between the energy source and the receiver as well as the dissipation of energy between them.

The graph 310 presents the voltage of the received signal energy over time with a rising edge 311 and a falling edge 312 on each of the energy envelopes 301. The wakeup mechanism is a clocked mechanism which when activated, integrates and clears the received signal energy to detect these rising 311 and falling 312 edges of the received signal envelope. In an embodiment, detecting both rising 311 and falling 312 edges of the envelope are required to monitor the power envelopes 301 of the received signals. In an embodiment, a detection threshold may be predefined to modify the sensitivity and/or selectivity of the wakeup receiver and to determine presence of the target signal. In an example embodiment, a higher detection threshold may result a less sensitive wakeup receiver, but in return may allow more selective wakeup receiver in a given condition.

Figure 4:
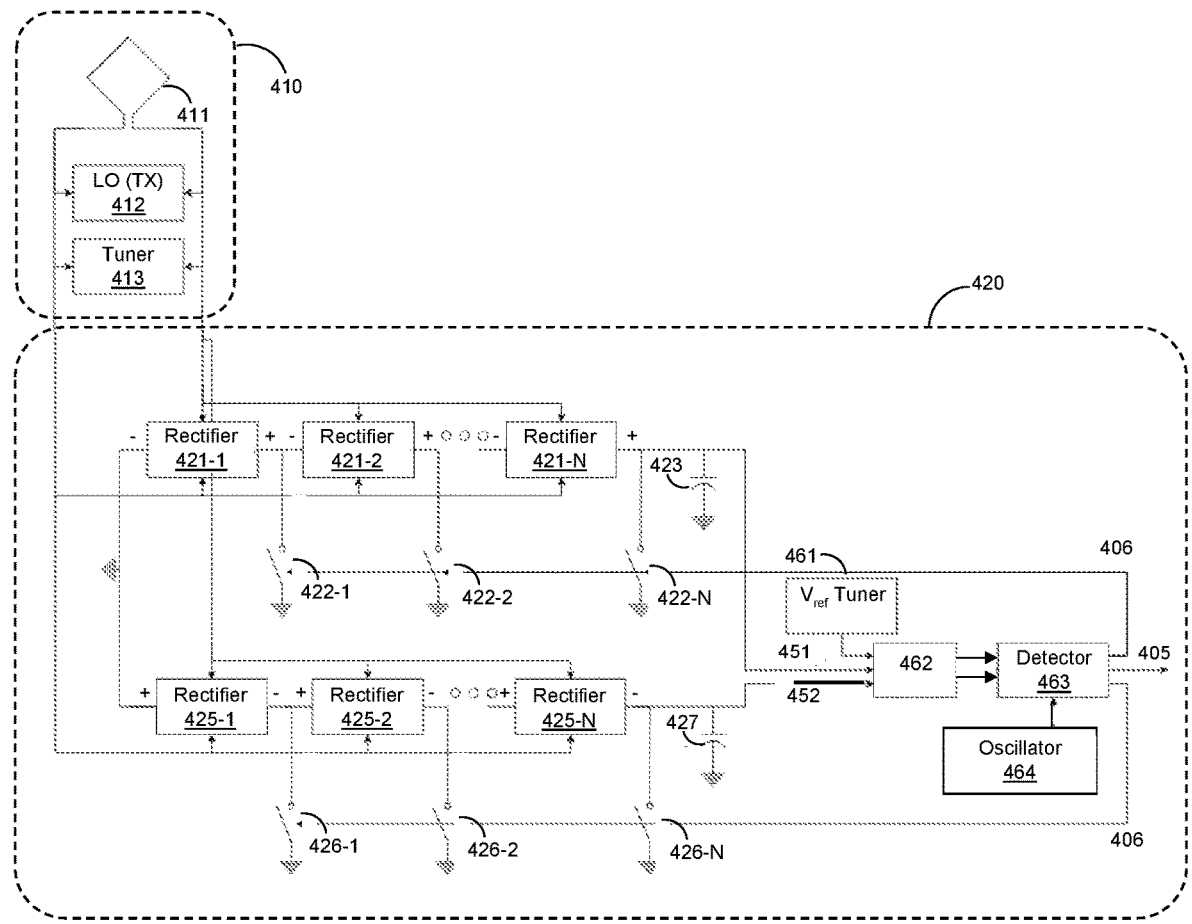
FIG. 4 is a block diagram of a wakeup receiver according to another embodiment.

FIG. 4 is an example block diagram of a differential implementation of a wakeup receiver 420 according to an embodiment. The differential implementation provides rejection of noise common to both inputs, such as supply and circuit induced noises that can limit the performance of the receiver.

The arrangement shown in FIG. 4 is advantageous when the antenna is differential. Here, the middle node of an even number rectifier chain is grounded. Resulting, the top row that ends at 451 will generate a positive voltage on top of the reference level, while the bottom row ending at 452 will generate a negative voltage on top of the reference level.

As illustrated in FIG. 4, rectifiers 421-1 through 421-N are respectively connected to switches 422-2 through 422-N. In a similar fashion, rectifiers 425-1 through 425-N are respectively connected to switches 426-2 through 426-N. The output of the RF-rectifiers 421 is a positive voltage ramp, while output of the rectifiers 422 is a negative voltage ramp. It should be noted that the last rectifiers 421-N and 425-N are connected to end switches 422-N and 426-N, respectively, which is configured to reset the load capacitors 423 and 427, respectively, in the wakeup receiver 420. Moreover, it is noted that the first rectifiers 421-1 and 425-1 are connected to a ground.

To improve immunity to induced noises, the comparator stage, including an offset tuner 462 and a reference tuner 461 operates the differential voltage between the outputs (451, 452) of the rectifiers 421-N and 425-N (where N is an integer equal or greater than 1). Here, noises common to nodes 451 and 452 are nulled when the comparator takes the difference between these nodes. It should be noted that wakeup receiver 420 has superior noise immunity compared to the wakeup receiver 220 (FIG. 2) due to the presented topology, which leads to fewer false wakeup detections.

The detector 463 outputs a wakeup signal 405 and a reset signal 406 when the differential voltage level is higher than the offset voltage. The reset signal 406 resets the switches 422 and 426. The detector 463 is enabled upon reception of a clock signal from an oscillator 464. The wakeup receiver 420 is configurable as discussed above with reference to FIG. 2.

In the arrangement shown in FIG. 4 the receiver 420 also shares an interface with the interface antenna 410. The antenna interface 410 includes an antenna 411, a local oscillator (LO)/transmitter 412, and a frequency tuner 414. In an embodiment, the antenna 411 may be a transmit/receive antenna for transmission and reception of radio frequency signals from an energy source in the vicinity. In another embodiment, the antenna 411 may include multiple antennas that may be alternatingly operated.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A wakeup circuit operable in a low-power wireless device, comprising:
   at least one radio frequency rectifier configured to output a rising transient voltage in response to existence of a radio frequency (RF) signal received at an antenna of the wireless device; and
   a detector, coupled to at least one of the at least one radio frequency rectifier, configured to output a wakeup signal when an input voltage level of the detector is higher than a reference voltage signal, wherein a signal output by the detector upon detection of a wakeup event causes resetting each of the at least one rectifier upon detection of the wakeup event; and
   wherein the wakeup circuit is coupled to an antenna interface of the wireless device; and
   wherein the low-power wireless device is an Internet of things (IoT) tag.

2. The wakeup circuit of claim 1, further comprises:
   at least one switch respectively connected to the at least one rectifier and configured to reset the respective the at least one rectifier upon reception of a reset signal; and
   a tuner configured to tune the reference voltage signal.

3. The wakeup circuit of claim 2, wherein a sensitivity of the wakeup circuit is set by tuning the tuner, wherein a level of the reference voltage signal is tuned to set at least the sensitivity of the wakeup circuit.

4. The wakeup circuit of claim 2, further comprises:
an oscillator configured to enable the detector at a clock signal.

5. The wakeup circuit of claim 2, wherein the at least one rectifier includes differential rectifiers connected to a pair of switches.

6. The wakeup circuit of claim 5, wherein the detector is a differential comparator configured to compare differential voltage levels to an offset voltage signal.

7. The wakeup circuit of claim 1, wherein a number of the at least one rectifier is configurable, wherein the number of rectifiers determine a sensitivity of the wakeup circuit.

8. The wakeup circuit of claim 1, wherein the low-power wireless device is operable to employ a BLE communication protocol.

9. The wakeup circuit of claim 1, wherein the wakeup signal is output upon detection of a BLE advertising beacon on a BLE Advertising channel.

10. The wakeup circuit of claim 1, wherein the wakeup signal is output upon detection of at least two consecutive BLE adverting beacons on at least two consecutive BLE Advertising channels.

11. The wakeup circuit of claim 1, wherein the antenna and the wakeup circuit are placed on a same substrate.

12. The wakeup circuit of claim 1, wherein the at least one radio frequency rectifier is at least a plurality of radio frequency rectifiers and wherein when the input voltage level of the detector is higher than the reference voltage signal, the signal output by the detector upon detection of a wakeup event causes resetting each of the at least plurality of rectifiers upon detection of the wakeup event.

13. The wakeup circuit of claim 12, further comprises:
at least one switch per rectifier each being coupled to respectively a respective one of the plurality of rectifiers and configured to reset the respective rectifier to which it is coupled upon reception of a reset signal; and
a tuner configured to tune the reference voltage signal.

14. The wakeup circuit of claim 13, wherein each switch is couplable at one end thereof to ground.

15. The wakeup circuit of claim 14, wherein a number of the plurality of rectifier employed at any time is configurable by controlling the coupling of one or more of the switches to ground.

16. The wakeup circuit of claim 1, wherein the detector outputs the wakeup signal within less than 100 microseconds from a moment an initial portion of the RF signal is received.

17. The wakeup circuit of claim 1, wherein the RF signal does not contain a specific wakeup command to be detected by the wakeup circuit to cause waking up in response thereto.

* * * * *